May 31, 1949.　　　V. W. BREITENSTEIN　　　2,471,929
HEATER CONTROLLING CIRCUIT
Filed Feb. 11, 1944　　　　　　　　　　　　2 Sheets-Sheet 1

Inventor
Victor W. Breitenstein
By
McCaleb, Wendt & Dickinson
attorneys

Patented May 31, 1949

2,471,929

UNITED STATES PATENT OFFICE 2,471,929

HEATER CONTROLLING CIRCUIT

Victor W. Breitenstein, Chicago, Ill., assignor to Illinois Testing Laboratories, Inc., Chicago, Ill., a corporation of Illinois Application February 11, 1944, Serial No. 521,961

18 Claims. (Cl. 236—78)

1

The present invention relates to heater controlling circuits, and is particularly concerned with improvements in a heater controlling circuit utilizing the amplifying and detecting systems covered by my prior application, Serial Number 283,335, filed July 8, 1939, and issued as U. S. Patent No. 2,341,526, on February 15, 1944.

One of the objects of the invention is the provision of an improved heater controlling circuit of the potentiometer type utilizing instead of galvanometer and associated intricate mechanical movements the trigger amplifying circuit system of my prior patent, above mentioned.

Another object of the invention is the provision of an improved controlling circuit of the class described, in which all of the factors that are apt to introduce error into the accurate measurement or control of the heater are accurately controlled or compensated.

Another object of the invention is the provision of an improved heater controlling circuit of the class described which has the advantage of an inherent supervising feature whereby the heating cycle is immediately stopped if the resistance in the control winding circuit increases or whenever the thermocouple or its lead wire becomes broken or open circuited.

Another object of the invention is the provision of an improved heater controlling circuit of the class described in which provision has been made for compensation of a change in the temperature of the cold junction of the thermocouple.

Another object of the invention is the provision of an improved heater controlling circuit of the class described in which the inherent disadvantage of the over-shooting and under-shooting of temperature has been substantially eliminated.

Another object of the invention is the provision of an improved heater controlling circuit of the class described which is adapted to hold the temperature of a furnace within very close limits by means of a proportional throttling of the heat input which anticipates the heat losses.

Another object of the invention is the provision of an improved heater controlling circuit which is adapted to hold the temperature of a furnace within very close limits by reason of the control of the otherwise uncertain factors of constancy of the applied A. C. voltage in frequency, change of resistance of windings, or change in voltage of D. C voltage sources employed Another object of the invention is the provision of an improved heater controlling circuit which has an extremely high sensitivity by reason of the fact that it implies an improved magnetic

2 amplifying system having a greater gain and sensitivity per stage of amplification than has been possible with the devices of the prior art.

Another object of the invention is the provision of an improved heater controlling system which is adapted to maintain its calibration over long periods of use, and which is sturdy and adapted to be used for a long period of time without necessity for repair or re-adjustment.

Other objects and advantages of the invention will be apparent from the following description and the accompanying drawings, in which similar characters of reference indicate similar parts throughout the several views.

Referring to the drawings, of which there are two sheets.

Figures 4, 8:
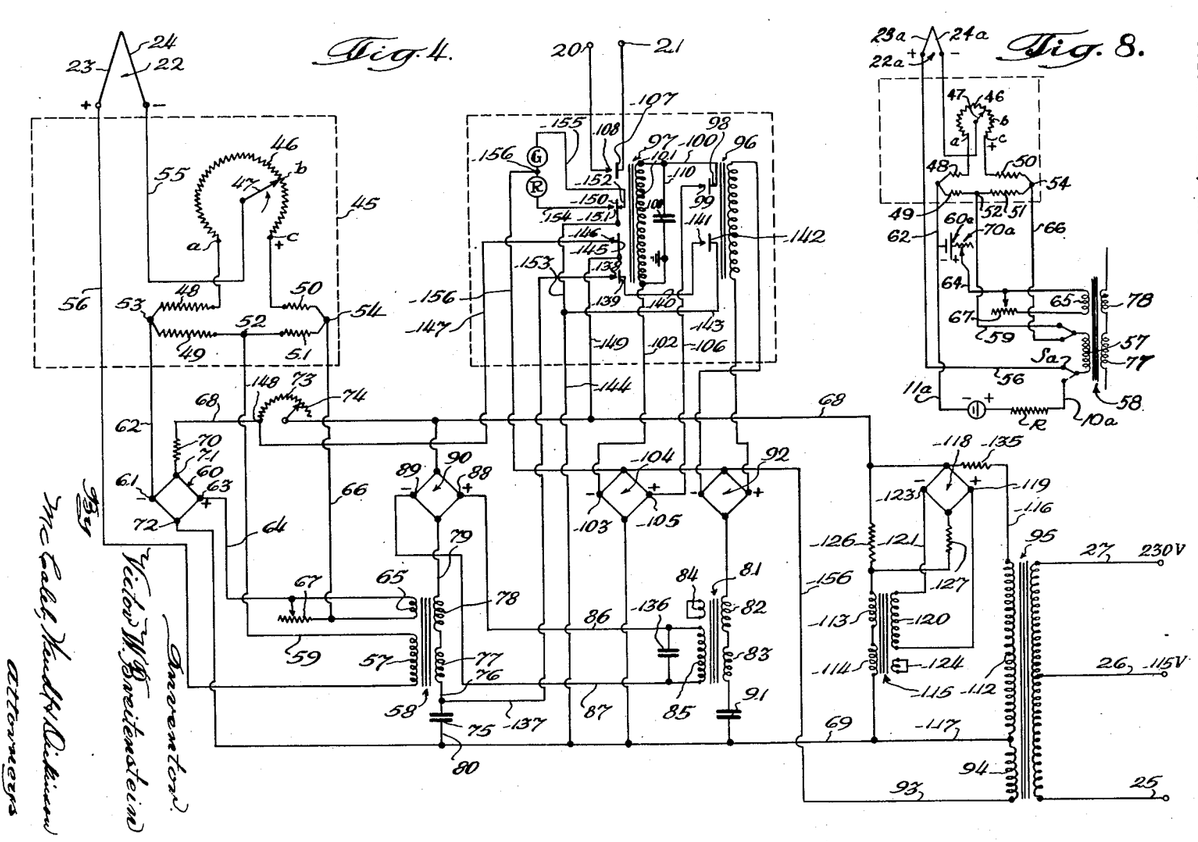
Fig. 4 is the complete wiring diagram of the heater controlling circuit embodying my invention.
Fig. 8 is a fragmentary view of a portion of a wiring diagram similar to Fig. 4, but showing the modification which includes a battery or dry cell and a variable resistor to provide a constant flow of current for the potentiometer circuit instead of the rectifier of Fig. 4.

Referring to Fig. 4, this is the wiring diagram of a heater control circuit embodying my invention, which is adapted to have the heater connected at the terminals 20, 21, at the top of the diagram. Various types of heaters may be controlled by the present circuit, such as, for example, electric heating elements, induction furnaces, oil burners, gas burners, coal stokers, or the like.

In the case of an electric heating element the heating element would be energized or de-energized by means of the relays illustrated, or additional relays. In the case of oil burners, gas burners, or stokers, the firing would be controlled by the same controlling circuits connected at 20 and 21 in the same manner in which a room thermostat controls such heaters.

The present circuit is adapted to be controlled by a thermocouple indicated at 22, consisting of dissimilar metal elements 23, 24, the terminal of the element 23 being indicated as positive, and that of the element 24 as negative.

The circuit is adapted to be energized from the usual 220–230 volt 60 cycle alternate current lighting circuit, from which 110–115 volts may also be secured as desired. The line terminals 25, 26, 27 are those of such a lighting circuit, and the voltages across these lines are indicated by their maximum values of 115 volts and 230 volts.

The present heater controlling circuit includes an amplifying system of the type disclosed in my patent, above mentioned.

Reference should be had to said patent for examples of the values of the circuit constants which may be used in constructing such an amplifying circuit. In brief, the amplifying circuit is of the type consisting of a reactor, a capacitor, and an alternating current actuated member in a non-linear resonant circuit.

Other details of the amplifying circuit and its mode of operation may be ascertained from my prior patent above-mentioned, in which the operation is illustrated with suitable curves, and four different operating conditions may be realized by the use of this circuit.

The present circuit may be operated under operating conditions described in my patent as Operating conditions No. 1 or Operating conditions No. 4. Under Operating conditions No. 1 the biasing of the energizing coils of the core reactor is such that if an additional small increment of ampere turns is applied to the direct current windings, the circuit goes into sustained oscillations as long as this increment is applied. When the ampere turns applied to the saturation windings are reduced to less than their critical value, oscillations cease.

For reasons which will be explained hereinafter in greater detail, I prefer to operate the present circuit under the operating conditions identified as Operating conditions No. 4 in my patent. According to these operating conditions, the addition of a small increment of ampere turns to the saturation windings causes the output current to jump up to a large value, and it stays at this current value, even if the additional increment of ampere turns has been removed.

The output current may then be returned to its starting value under the Operating conditions No. 4 by short circuiting the condenser or interrupting the terminal voltage for a short instant.

Figure 1:
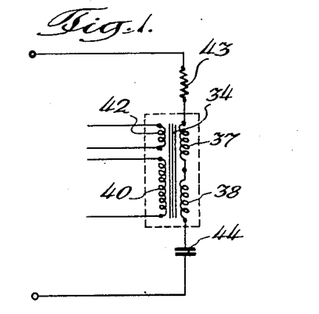
Fig. 1 is a wiring diagram showing diagrammatically the elements of a simple amplifying trigger circuit of the type utilized in the invention, for the purpose of explanation.

The basic circuit is shown in Fig. 1 consisting of saturable core-reactor 34, a capacitor 44 and an alternating current actuated member 43. The reactor is equipped with 2 balanced alternating current reactance windings on the outside legs in such a way that with no direct current flux applied to the center-leg, the center-leg will have no alternating current flux, as illustrated in my said patent.

This reactor is further equipped with two direct current saturating windings one of which is the biasing winding 42 and the other the control winding 40 which should have many turns and still be of low ohmic resistance to provide a low impedance path for the induced voltage of double the operating frequency. This circuit is operated by the variable reactance of the reactor while holding operating alternating voltage, capacitor and load impedance constant. The reactance is varied by the two direct current saturating windings.

Figure 2:
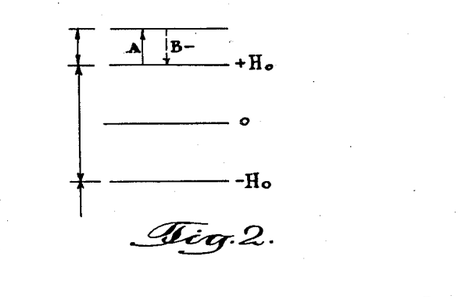
Fig. 2 is a diagram included for the same purpose, illustrating the critical biasing arrangements for the energizing coils and showing the level of energization above which the heating cycle commences.

Referring to Fig. 2, 0 indicates the line of zero bias and the lines at $+H_0$ and $-H_0$ indicate the levels or lines of critical bias of opposite polarity. The reactor is brought up to saturation to this critical bias by means of the biasing winding 42 which is a constant value for all phases of operation for this circuit.

If the critical direct saturation is now slightly increased the circuit becomes unstable and the alternating current rises abruptly or breaks out in oscillations, which take place when a small direct current starts to flow in the control winding 40 in such a direction as to increase the total direct current saturation of the reactor.

Therefore between the lines $+H_0$ and $-H_0$ the circuit will not oscillate if the sum of all direct saturations acting upon the reactor in one or more windings on the center-leg of the reactor stays within these critical limits. Assuming that abrupt rise or oscillations represent the heating period in this temperature controller and the no-oscillation area the cooling period, then the application of a calibrated small critical amount of ampere turns, indicated by the letter H, to the input of the control windings, in the same direction or polarity as the critical bias, will cause oscillation or heating until the additional bias is counterbalanced by an electromotive force that is generated by the controlling thermocouple. In other words, during the heating cycle the heat generated heats the thermocouple and generates an E. M. F. which is used to counterbalance the additional increment of bias that was supplied by the energizing circuits to place the circuit in oscillation and bring about the heating.

In Fig. 2 the additional bias applied to cause oscillation and institute the heating cycle is indicated by the arrow A, and the counterbalancing thermocouple output is indicated by the arrow B.

A potentiometer with its inherent advantages provides means for opposing a known potential to an unknown potential in this case of a thermocouple. The two E. M. F. are connected in such manner as to oppose each other electrically. As long as one is stronger than the other, a current will flow through the source of unknown potential. When both are equal no current will flow and the potentiometer is balanced.

Figure 3:
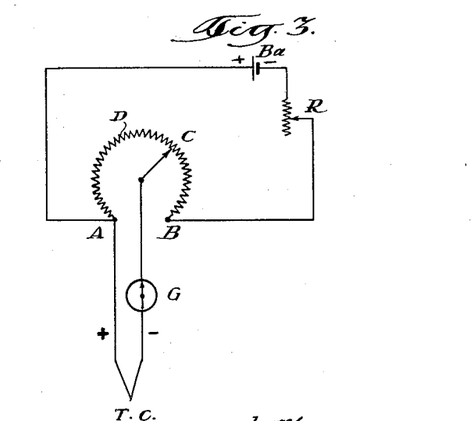
Fig. 3 is the basic form of a potentiometer thermocouple measuring circuit.

Fig. 3 shows the basic potentiometer-thermocouple measuring circuit consisting of the thermo-couple T. C. slidewire D, battery Ba and variable resistor R.

A constant current flows continuously through the potentiometer which is a slidewire of uniform resistance on which the temperature scale is fixed in relation to the resistance. This current as it flows through the points A—C—B sets up a difference of potential between A and B and there will be also a difference of potential between A and all other points of the slidewire D.

The polarity of this E. M. F. is opposing to the E. M. F. of the thermo-couple which is connected to the potentiometer at A and C. If point C is moved along the slidewire D a point will be found where the potential between A and C of the slidewire is equal to the E. M. F. generated by the thermo-couple.

A galvanometer or any other sensitive instrument in the thermo-couple circuit would indicate when this balance point has been reached, since at this no current flows and there would be no pointer deflection. In this circuit, however, instead of a galvanometer the non-linear resonant trigger circuit is used and the unbalance of the thermo-couple circuit feeds into the control winding of the reactor.

Referring now to Fig. 4 at the left top the rectangle 45 in dash lines encloses the potentiometer and thermo-couple circuits of this temperature controller which comprises the calibrated measuring part of the system. It includes the slidewire 46, the movable contact 47 and the fixed resistors 48, 49, 50 and 51 forming a bridge, the purpose of which will be explained later.

The potentiometer circuit is energized by means of a full-wave rectifying bridge 60 which in turn is energized by a constant voltage source of alternating current through the conductors 68 and 69.

Since the potentiometer current must be very constant and is calibrated to a given operating range of the instrument and a constant current is also needed for the biasing winding 65 of the reactor, therefore the biasing winding is designed to require a current somewhat smaller than the potentiometer current to produce the necessary ampere turns. Shunt 67 provides the by-pass for variations in individual reactors. Therefore potentiometer current flows through the biasing winding 65 by means of conductors 64 and 66.

The conductor 68 is connected through a resistance 70 to the terminal 71 of the rectifier 60. The conductor 69 is directly connected to the terminal 72 of the rectifier 60.

The adjustable resistor 73, with movable contacts, included in the circuit of conductor 68, is for the purpose of providing a voltage drop, the use of which will be later described.

Instead from the rectifier 60 the direct current potential may be also supplied by a battery or dry-cell and a variable series resistor to adjust for a constant flow of current in the potentiometer circuit.

Referring to Fig 8, this is a wiring diagram illustrating such a modification. In this case the thermocouple is indicated by 22a, and it includes a pair of dissimilar metal elements 23a, 24a. The battery is indicated by the numeral 60a and the variable resistance by the numeral 70a.

SC indicates a standard cell connected in series with a series resistance R and used to calibrate the battery 60a. The same transformer 58 has primary coils 77, 78. The secondary 65 is connected to the variable resistor 70a by conductor 64. The other terminal of this secondary 65 is connected to an adjustable resistor 67, which has an adjustable contact connected to the conductor 64.

The other secondary coil 57 is connected by a conductor 59 to the point 52 between the resistances 49, 51. The opposite end of control coil 57 is connected by conductor 56 to thermocouple 23a.

A conductor 66 from the point 54 between resistances 50 and 51 extends down to one of the arms of a double throw switch $S_a$. The other contact of the double throw switch is connected by conductor 10a to the resistance R, which is in series with the standard cell, and which is connected by conductor 11a to the left terminal of the battery 60a and conductor 62.

The operation of this type of circuit is as follows: Instead of securing potential from the rectifier 60, potential is supplied by the battery 60a and the variable resistance 70a, which may be adjusted for a constant flow of current in the potentiometer circuit.

In order to adjust or standardize this potential, the standard cell SC is employed, the voltage of which is constant. The standard cell SC is connected in opposed polarity to the battery 60a by means of the double pole switch $S_a$. This double pole switch disconnects the thermocouple when it is thrown to its lower position (Fig. 8); and the rheostat R is then adjusted until the current flowing in the potentiometer circuit is such that as it flows through the slide wire 57 and resistances 48, 49, 50, 51, 65, and 65 the potential drop is equal to the voltage of the standard cell.

No current then flows in the control coil 57, as indicated by the amplifying circuit in the same way as when this circuit is used with a thermocouple. The point where transition or oscillations are about to start indicates the point of no current flow.

By this operation the current in the potentiometer circuit has been standardized. The switch $S_a$ is then reversed and moved to its upper position in Fig. 8, disconnecting the standard cell and connecting the thermocouple in the circuit for control of the temperature of a furnace or the like.

Since there is a constant voltage alternating current impressed on the rectifier 60 at its terminals 71, 72, there will be a constant current flowing through the potentiometer and the biasing winding 65. When the potentiometer is balanced no current flows through control-winding 57 and only the critical saturation $H_0$ from the biasing winding acts on the reactor and the circuit will not oscillate and therefore no heating takes place. The furnace consequently starts to cool and the E. M. F. generated at the thermocouple becomes smaller than the potential between b and c on the slidewire and a small current starts to flow in circuit consisting of thermocouple 22, control-winding 57, slide-wire portion b—c and associated resistances 50 and 51.

The polarity of this current flow is such as to produce a direct current flux which is in phase or in the same direction as the flux produced by the biasing winding 65, therefore the total direct current saturation H is now larger than the critical $H_0$ and oscillations start and consequently the relay will close and the heating period starts.

As the temperature increases a higher E. M. F. is generated by the thermo-couple, the unbalance becomes smaller and finally these potentials are equal and opposite, no current flows and the potentiometer will be balanced. In this condition slider 47 indicates the true temperature in relation to its position to slide-wire 46. Since no current flows it is immaterial if the resistance of this circuit changes within reasonable limits which factor is of great advantage and an inherent feature of the potentiometer circuit.

The control winding 57 is preferably of low resistance, as the operation of such a core reactor inherently results in an alternating current component of double the frequency of the applied voltages, and such a higher frequency component requires a low resistance by-pass for the best operation of the system.

This necessity for a low resistance control winding circuit also gives the present circuit the characteristic of a supervisory safety feature. A high resistance in the control winding circuit would prevent the amplifying circuit from oscillating; and since oscillation corresponds to the heating period, there would be no heat unless the control winding circuit is maintained at low resistance.

An open circuit is, of course, equivalent to a very high resistance; and if the thermocouple leads or any other part of the control winding circuit should be broken or open circuited, there would be no oscillation and no heating. This makes the system inherently safe because an open circuit in the control winding will not cause the heat control to run away, but will automatically shut off the heat.

The potentiometer circuit is preferably so arranged that there is automatic compensation for change in temperature of the cold junction of the thermocouple.

The E. M. F. generated by a thermocouple depends upon the temperature difference between the measuring or hot junction of the thermocouple and the reference or cold junction of the thermocouple. Any method for accurately measuring temperature by means of a thermocouple must provide means for correcting or compensating for the temperature of this cold junction or for maintaining the cold junction at a constant temperature.

This may be accomplished in the present case by making the resistors 48 and 49 of manganin of higher ohmic value, the resistor 50 of low ohmic value, and the resistor 51 of nickel wire of low ohmic value, having a positive temperature coefficient. This nickel wire resistance 51 should be mounted in close proximity to the cold junction of the thermocouple so that both are always at the same temperature.

The proportions of these resistors are such that as the temperature of the cold junction changes it varies the resistance of the nickel wire resistor 51 so that it compensates for changes in temperature of the cold junction by varying resistance 51.

The effect of such a variation of the resistance 51 may be explained as follows: The E. M. F. of the thermocouple is measured by balancing it against the potential from the point $b$ to the point C on the slide wire 46 of the potentiometer, the point $b$ indicating the magnitude of the balancing potential. If the point $c$ were also made movable on the slide wire, then the magnitude of the potential $bc$ might be varied from either point $b$ or point $c$, thus giving the control for compensating for the cold junction temperature by adjusting the slider at $c$ with respect to the end of the slide wire.

As the cold junction temperature rises, the net electromotive force generated by the thermocouple decreases, assuming, of course, that the temperature at the measuring junction is constant. To balance or compensate for this decreased electromotive force, the point $c$ should be moved along the slide wire to a point nearer to $b$, decreasing the total resistance between $bc$ and including resistor 50.

The same result can be accomplished by having the resistance 51 increased, which takes place automatically as the cold junction temperature increases because the nickel has a positive temperature coefficient. Thus, the nickel wire resistor 51 has practically the same effect upon the balancing potential $bc$ as if the point $c$ were moved up or down on the slide wire to its corrected position; but the nickel wire resistor compensates automatically when the resistors are provided in proper proportion to each other.

The biasing winding 65 is also preferably wound with manganin wire, which derives its biasing current from the potentiometer, and the resistor 67 permits the voltage applied to the coil 65 to be adjusted to deliver the critical bias to the coil 65.

The output of such a controlling circuit when it breaks into oscillations is not sufficient to permit the operation of a rugged relay directly; and therefore this output is fed through the loads 79 and 80 to a second stage of amplification. This amplifier has a similar core reactor, the core of which is indicated at 81, and it is provided with the similar alternating current windings 82, 83. For larger current swing, it has a short circuited winding 84.

In some embodiments of the invention the second stage may be omitted and the first stage output may be used to actuate a suitable relay.

It is provided with a direct current control winding 85 into which feeds the rectified output of the first stage of the non-linear resonant circuit, consisting of capacitor 75, reactor 58 and rectifier 90 for further amplification.

The resonant circuit includes the capacitor 91 in series with the A. C. windings 82, 83. The circuit constants of this stage are such that proportional amplification is achieved. The A. C. windings 82, 83 are connected in series with the rectifier 92, which may be energized with alternating current through the leads 69 and 93 from a secondary winding 94 of the transformer 95 for the reason that this stage does not require closely controlled voltage of the energizing alternating current.

As previously stated, the output of the control circuit of the first stage is not sufficient to operate a rugged relay directly. For example, the first or control stage output might swing between 0.3 and 1.2 ma. The second stage, for example, will amplify this output so that its output will swing from 3–4 ma. to 11–13 ma., depending upon the operating voltage. The second stage is thus adapted to operate directly a rugged relay, such as that indicated at 96; and the adjustment of this relay is preferably such that it will pull in at about 10 ma. and drop out at about 4.5 ma. Thus there is a considerable factor of safety between the range of swing of the output of the second stage and the current values required to operate the relay 96 on or off.

When the temperature controller calls for heat, both stages will oscillate in unison; and the relay will also oscillate on and off in unison with the oscillating current of the second stage. This means that the relay would turn the heating circuit which it controls on and off during oscillation of the controlling circuits; and it is, therefore, desirable to add a timing device or to utilize some other means which will hold the relay contacts closed for the duration of these oscillations.

This is accomplished by utilizing a second relay 97. Thus the relay 96 includes contacts 98, 99 for controlling the relay 97. Contact 98 is connected by conductor 100 to one terminal of the coil 101 of the relay 97. The other terminal of this relay is connected by conductor 102 to the negative terminal 103 of a rectifier 104. The other or positive terminal 105 of rectifier 104 is connected by conductor 106 to the movable contact 99 of relay 96.

These contacts are normally open and are closed when the relay 96 is energized, thus closing the circuit by means of which relay 97 is energized through the rectifier 104. The relay 97 includes fixed contact 107 and movable contact 108, which are connected to the heater leads 20, 21. These contacts are normally open, being closed only when relay 97 is energized by relay 96 during a heating period.

The second relay 97 is provided with a large charging condenser 109, which is connected by conductors 110, 111 across the terminals of its coil 101. The electrical constants of the relay 97 and condenser 109 are such that this condenser will be charged when the first relay 96 is operated, and the charge is enough, after the first relay 96 is de-energized, to hold the second relay 97 closed for five or six seconds.

Since the oscillations of the trigger control circuit and proportional amplifying circuit and of the first relay 96 generally occur with an interval of from two to four seconds, a timing or hold-over of five to six seconds on the second relay 97 will be sufficient to hold this relay closed, as a second oscillation and closing current will be impressed upon the second relay before it has been released from the first oscillation.

Thus the second relay 97 is adapted to hold the heater circuit closed as long as the controlling circuits are in oscillation. The second relay 97 may have its rectifier 104 energized from the leads 69 and 93 to the secondary 94 of the transformer 95, as it is not necessary that this applied voltage be controlled within close limits.

The first stage or the trigger control circuit and potentiometer circuit are preferably energized from a substantially constant source of alternating current, and such a source of alternating current may be provided by utilizing another core reactor circuit, which is shown at the lower right in Fig. 4.

This circuit includes a transformer 95 with the leads 25, 26, 27 adapted to be energized by ordinary lighting circuit alternating current of the voltages indicated. The secondary 112 of this transformer may be used to energize alternate current windings 113, 114, on the core reactor 115, the windings being connected in a similar way to those previously described.

Figure 5:
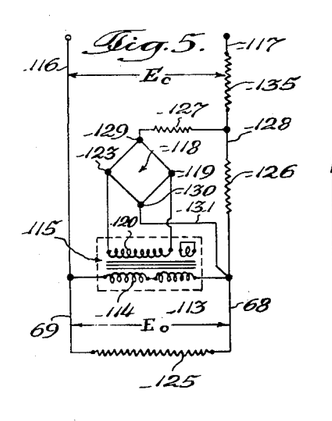
Fig. 5 is a simple wiring diagram of a circuit for producing a constant energizing voltage, which is includued for the purpose of explaining the more complex arrangements included in the invention.

Reference should now be had to Fig. 5, which discloses a core reactor 115 provided with the same windings 113, 114 energized from the leads 116, 117. The core reactor is provided with a rectifier 118, the positive terminal 119 of which is connected to one of the terminals of the control winding 120 on the core reactor. The other terminal of this winding is connected by conductor 121 to the negative terminal 123 of rectifier 118.

In Fig. 5 the output of this circuit is produced at the leads 68, 69, which merely for illustration are provided with a resistance load 125. In Fig. 5, 126 indicates a current limiting series resistance which is connected in series with the load 125 to be operated at the controlled voltage. The saturable core reactor 115 is a voltage sensitive element in shunt with the load, and it is automatically regulated by the direct current output of the rectifier 118, and it is operated by the alternating voltage drop across the limiting resistor 126.

Resistance 127 is connected from the conductor 128 to the input terminal 129 of the rectifier 118, and the other input terminal 130 of the rectifier is connected by conductor 131 to conductor 69 on the other side of resistance 126.

Figure 6:
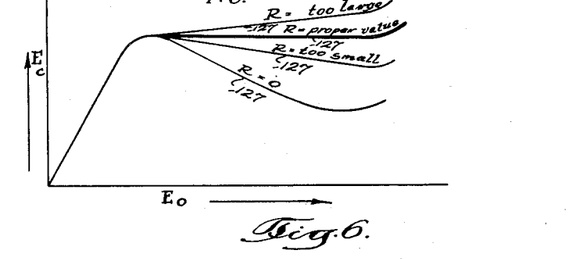
Fig. 6 is a diagram showing the relation between input and output voltages for different values of resistor 127.

The resistance 127 controls the slope or the ratio of output voltage to impressed voltage, the output voltage being shown in a curve in Fig. 6. In this curve $e_c$ represents the ordinates and $e_0$ the abscissae. $E_c$ represents controlled voltage which it is desired to maintain constant at the leads 68 and 69, and $E_0$ represents the operating voltage which is applied at the conductors 116, 117.

It is found that by adjusting the value of the resistor 127 the slope of the curves may be quite accurately determined. Thus, the lowest curve in Fig. 6 is the one which results when operating voltage is plotted against line voltage with zero value of the resistance 127. When this resistance is still too small, the second curve may result; and if the resistance is too large, the slope may be upward, as shown in the top curve, but a proper value of the resistance 127 will give a substantially horizontal curve, which is the one shown with a heavy line.

The value of this resistance can be very quickly determined by having an adjustable resistance and adjusting it until the output voltage is constant.

Another resistance, No. 135, may be included in series with the conductor 117; and this resistance has the capability of shifting the controlled range of voltage output to any predetermined portion of the input voltage. A thirty-five to fifty percent controlled range is easily obtainable.

Referring now to the right hand portion of Fig. 4, the same resistances will be found in the circuit; and the source of applied voltage is the secondary of transformer 95.

By choosing the proper circuit constants, a constant voltage will be provided at the leads 68, 69 for energizing the necessary components. This voltage must be constant up to the moment transition or oscillation starts, which is the calibrated reference point of the system.

The condenser 136 is included across the circuit of the winding 85 of the core reactor 81 for the purpose of by-passing the component of double the frequency of the applied voltage.

In order to secure a better over-all performance of the controller, I prefer to operate the first stage of the present system under the operating conditions known as Operating conditions No. 4 in my prior patent. This involves operating the first stage at a slightly higher alternating current voltage, at which the circuit will lock in when the applied ampere turns to the windings of the reactor reach a critical value.

This results in a higher current swing, but the circuit stays locked in. In order to reset the circuit it is necessary either to short circuit the condenser 75 or to interrupt the applied voltage for a short period of time.

In the present circuit a conductor 137 is connected to the lead 76 on one side of the condenser 75, and it is connected to a normally open contact 138. The other contact 139 on the relay 97 is connected by the conductor 140 to a normally open contact 141 adapted to engage another contact 142, when the relay 96 is energized. The contact 142 is connected by conductor 143 to the contact 142, which is connected to the conductor 69 on the other side of the condenser 75.

Thus the energization of relay 96 will close the contacts 141, 142, and the contacts 138, 139 will also be closed when the relay 96 is energized. Energization of both relays is thus necessary to short circuit the condenser 75; and when this condenser is short circuited, the locking-in feature of the oscillating circuit of the core reactor 58 will be released. That is, the circuit will be reset for another oscillation.

This also arranges the circuit so that the power contact of the second relay 97 is closed in the shortest possible time to deliver heat to the furnace when there is a demand for heat.

"On" and "off" controllers have the disadvantages of over-shooting and under-shooting the desired temperatures because the temperature will go up after the heating has ceased, depending on the heat inertia of the furnace and the rate of heating; and when the furnace is cooling, the temperature will continue to decrease after the heating period has been started, in the devices of the prior art. That would also be true of the present device, in a lesser degree, but I prefer to arrange the present controller system so that there is a proportional throttling of the heat input which anticipates the heat losses, so that the temperature in the furnace may be held close to a predetermined value.

Such a throttling effect may be achieved by utilizing a control, such as a rheostat, for the electric current, the output of which varies uniformly, or by means of the proportional opening and closing of a valve for gaseous or liquid fuel; but it may also be accomplished by having the full input flowing over a time interval, which may be varied proportionally.

The present controlling system is adapted to provide proportional throttling of the heat input by varying the length of the interval of heating and also varying the "off" period as required to maintain a constant temperature. This is accomplished in the following manner:

An additional pair of contacts 145, 146 are provided on the second relay 97, to be closed when the relay is energized. Contact 146 is connected by conductor 147 to the conductor 68 at the left terminal 148 of the adjustable resistance 73. Contact 145 is connected by conductor 149 to the conductor 68 on the other side of the resistance 73; that is, the right side.

When the contacts 145, 146 are closed, the resistance 73 is shunted. The operation of this arrangement is as follows:

The present controller operates with two operating points:

1. Before oscillations (Fig. 2) the calibrated reference operating point is the line $+H_0$. This is the calibrated reference operating point during the cooling period.

2. During the heating period, or when the system is oscillating, the controller operates with a shifted reference operating point, the shift being accomplished by means of the contacts 145, 146.

This shifted operating point is produced by operating the controller during its heating cycle with a fictitious bias, which is smaller than its calibrated one, and is produced by introducing in the lead to the rectifier, which delivers the bias, a voltage drop, which is shunted by a separate pair of contacts 145, 146 of the relay 97.

The voltage drop is the adjustable resistance 73 contacted by slide arm 74, which is interposed in the conductor 68. This resistor is adapted to be shunted by contacts 145, 146 of the timing relay 97 when the relay is de-energized.

For the calibrated operating point, which coincides with the cooling period, these contacts are closed; and this resistor is shunted out. Therefore, no voltage drop exists due to the resistor 73 during the cooling period, and the full voltage is applied to the rectifier 60 and its associated circuit.

For the second operating point, which coincides with the heating period, the relay 97 is energized, and the contacts 145, 146 are opened, and the voltage drop across the resistor 73 will reduce the potential that is applied to the rectifier 60, which will result in a reduction in the direct current output potential that is applied to the biasing coil 65, thus creating a shifted operating point.

Since the resistance 73 is shunted out when the calibrated reference point is used during cooling, the resistance may be made variable without affecting the calibrated reference point; and this permits the operator to control the range of the region between the calibrated and the shifted operating points to match the controlling circuit to furnaces of different characteristics and operating conditions.

If a furnace has a high temperature inertia and has a tendency to continue to heat up a great deal after the furnace is shut off, then the variable resistance 73 may be increased to separate the calibrated reference point and shifted operating point; but, if the furnace has a relatively low temperature inertia, then the region between these operating points may be made smaller by reducing the value of the variable resistance 73.

Figure 7:
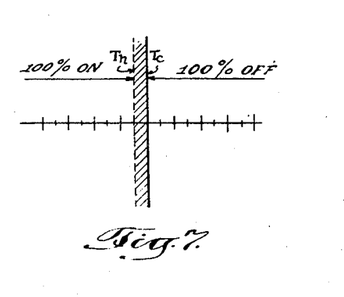
Fig. 7 is a diagram used for the purpose of explaining the feature of throttling between the two operating points to eliminate over- and under-shooting.

Fig. 7 illustrates a temperature scale with low values on the left side and high values on the right side of a line $T_c$, which corresponds with the calibrated operating point and which coincides with the cooling period. The line $T_h$ indicates the shifted operating point, which coincides with the heating period. For all temperature values which are on the left side of the line $T_h$ one hundred percent heating will take place, but no heating at all will take place for all temperature values at the right side of the line $T_c$. Within the small region between these two lines there will be a reduced or throttled heating result, which is accomplished by short "on" and "off" periods of variable length. In other words, when the thermocouple registers temperatures below that of $T_h$, the full heating capacity of the heater will be used; and for all temperatures above $T_c$ there will be no heating whatever. Between these two temperatures the heater is controlled by being turned on and off, having a number of short heating periods separated by short cooling periods.

The length of these heating periods varies as the temperature approaches $T_c$. One of the inherent characteristics of the controller when provided with this feature is that within the temperature range between the two temperatures shown in Fig. 7 the controller will periodically change from "on" to "off" and from "off" to "on."

For temperatures closer to $T_c$ the "on" periods will be longer, and the "off" periods will be shorter. The length of the "on" periods will progressively become shorter and the length of the "off" periods will progressively become longer as the temperature of the furnace as registered by the thermocouple comes closer to $T_c$.

The net result is that the heater is not kept on continuously until the furnace temperature reaches $T_c$, but before it reaches that temperature the heater is turned off and the heating effect throttled, the throttling becoming more marked as the temperature of the furnace approaches the desired calibrated temperature.

Over-shooting of the temperature is thus substantially eliminated, and the same is true with regard to under-shooting of the temperature.

If the temperature of the furnace cools slightly below $T_c$, heat is supplied during short "on" and long "off" periods; and if the temperature continues to drop, the "on" periods become longer and the "off" periods shorter, until when the temperature drops below $T_h$, the furnace is on continuously until its temperature is raised to $T_h$, when the throttling effect again takes place.

The relay 97 may also be used to indicate whether the heater is on or off by providing three contacts 150, 151, and 152. Contact 150 is connected by a conductor 153 to the conductor 69. Contact 151 is connected by conductor 154 to the terminal of a red lamp. The other contact 152 is connected by conductor 155 to one of the terminals of a green signal lamp, indicated by the letter G. The red lamp is indicated by the letter R. The two lamps G and R have their terminals connected to a common conductor 156, which is connected to the conductor 93. Thus the red lamp is adapted to be energized when the contacts 151 and 150 are closed while the green lamp is energized, when the contacts 150, 152 are closed.

Since red indicates most conveniently the heating period and green the cooling period, the contacts 150 and 152 are normally closed when the relay 97 is de-energized, and when the relay 97 becomes energized the contacts 150, 152 are broken and the contacts 150, 151 are closed. Thus the red lamp is lit whenever heating is taking place, and the green lamp is lit whenever cooling is taking place.

The operation of the various parts of the controlling circuit will be apparent from the foregoing description of the circuit arrangements and their functions. The operation of the complete system is substantially as follows:

The potentiometer, comprising the slide wire 46 and the slider 47, is provided with a temperature scale, to which a pointer, carried by the slider, points. When the system, including the heater that is connected to conductors 20 and 21, is energized, starting from a cold condition, if the sliding contact 47 and its pointer are set at a temperature above the temperature of the furnace, heating will commence at once until the temperature of the furnace is brought up to the temperature $T_h$, after which heating continues with the throttling effect of varying on or off periods until the temperature reaches $T_c$, at which the sliding contact 47 is set. Thereafter during the operation of the furnace the controlling circuit is energized, but the saturation of the core of the core reactors 58 and 81 is held at the critical point indicated by the line $H_0$ in Fig. 2, which is a critical point.

If the temperature is to be raised slightly, the pointer 47 may be moved to the new temperature, which will produce a condition of unbalance in the potentiometer that will cause the flow of an additional increment of off-balance current in the winding 57. This will throw the core reactor circuits of the first stage into oscillation, and the oscillations will occur with an interval of from two to four seconds, and the output current will swing between 0.38 and 1.2 milliamperes. This output will be proportionally amplified in the second stage, which will also be in a state of oscillation, with a current swing of 3-4 amperes to 11-13 milliamperes.

The second stage current output is sufficient to actuate the relay 96, which pulls in at about 10 milliamperes and drops out at 4.5 milliamperes, but the relay 96 will oscillate on and off as the oscillating current in the first and second stages fluctuates in value.

Energization of the first relay 96, however, will close contacts 98, 99, which energizes the second relay 97; and due to the use of the charging condenser 109, which is shunted across the core of the second relay, there will be a hold-over in the energization of the second relay that will keep the second relay energized, even though the output current of the second stage goes below 4.5 milliamperes or down to a low of 3–4 milliamperes.

The energization of the second relay as well as the first closes the contacts 141, 142 and contacts 138, 139, which are adapted to short circuit the condenser 75 in the first stage, and to reset the circuit, so that it is not locked in, resulting in oscillations.

The energization of the second relay also closes the contacts 107, 108 to the heater so that the heating period begins, and these are held closed as long as the circuits are in a state of oscillation which corresponds to the heating period.

The energization of the second relay 97 also closes the contacts 146, 145, which shift the calibrated operating temperature during the heating period so that during the heating period the heating is not continued until the furnace reaches the set temperature, but is continued only until the furnace temperature reaches a new cut-off temperature $T_h$, after which the heating continues with the throttling effect that is produced by progressively shorter "on" periods and progressively longer "off" periods until the temperature reaches $T_c$, which is the temperature at which the potentiometer has been set.

The present circuit is provided with a constant voltage by the core reactor circuit, which is diagrammatically shown in Fig. 5 and also included at the right hand part of Fig. 4. Very great variations in the applied line voltage will not effect the accuracy of this controller, due to the use of this constant voltage supply circuit.

The present system is adapted to operate for a long period of time without losing its calibration, and it is sturdy and rugged because it permits the use of relatively rugged relays. There is a factor of safety between the output of the current to the relay and the amount of current required to turn the relay on or off, and this assures the operation of the relay on every occasion when the furnace demands heat.

The present system will retain its calibration for a long period of time without necessity for recalibration, and it will produce a substantially constant temperature without over-shooting or under-shooting of the devices of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a heater controlling circuit, the combination of a trigger control circuit including a resonant core reactor circuit adapted to be placed in a state of oscillation by the application of a small increment of direct current voltage, to provide an oscillating output current of sufficient value to actuate a relay, with a relay actuated by said output and adapted to oscillate on an off with the current oscillations of said output, and a second timing relay controlled by said first-mentioned relay, said timing relay being connected to control a heater energizing circuit, means for energizing the trigger control circuit, which includes a variable resistor, and means for changing the energization during the heating period to effect a heating with a lower calibrated reference temperature during heating to prevent over-shooting of the temperature attained, said latter means comprising contacts carried by the second relay for short circuiting the said variable resistor during the heating period.

2. In a heater controlling circuit, the combination of a trigger control circuit including a resonant core reactor circuit adapted to be placed in a state of oscillation by the application of a small increment of direct current voltage, to provide an oscillating output current of sufficient value to actuate a relay, with a relay actuated by said output and adapted to oscillate on and off with the current oscillations of said output and a second timing relay controlled by said first-mentioned relay, said timing relay being connected to control a heater energizing circuit, and constant voltage means for energizing said trigger control circuit, comprising a saturable core reactor having energizing alternating current windings, a direct current biasing winding energized from a rectifier, and a resistance in series with the input of said rectifier, said resistance being calibrated to provide a substantially constant voltage output from the alternating current circuit of said core reactor.

3. In a heater controlling circuit, the combination of a trigger control first stage circuit including a core reactor, with a proportional amplifying second stage including a core reactor, each of said core reactors being provided with alternating current energizing windings and with a capacitor in series with said alternating current windings to provide a resonant circuit, each of said core reactors being provided with a biasing winding, the biasing winding of the second stage being energized from the output of the first stage through a rectifier, and the biasing winding of the first stage being energized through a rectifier, with a substantially constant critical current, a controlling winding on said first stage, and a potentiometer having a thermocouple connected across its circuit for energizing said control winding, whereby current is not provided in the control winding unless the potentiometer is out of balance, and the current in the control winding is reduced to zero when the potentials of the potentiometer are counter-balanced by the thermocouple, a relay connected to the output of the second stage through a rectifier, said first stage producing an output of oscillating direct current, and said second stage producing an amplifying output of oscillating direct current adapted to actuate said relay, said relay oscillating on and off with the oscillation of direct current output of said first and second stages, and a second timing relay controlled by the first relay and adapted to remain closed through-out the oscillation of the first and second stages.

4. In a heater controlling circuit, the combination of a trigger control first stage circuit including a core reactor, with a proportional amplifying second stage including a core reactor, each of said core reactors being provided with alternating current energizing windings and with a capacitor in series with said alternating current windings to provide a resonant circuit, each of said core reactors being provided with a biasing winding, the biasing winding of the second stage being energized from the output of the first stage through a rectifier, and the biasing winding of the first stage being energized through a rectifier, with a substantially constant critical current, a controlling winding on said first stage, and a potentiometer having a thermocouple connected across its circuit for energizing said control winding, whereby current is not provided in the control winding unless the potentiometer is out of balance, and the current in the control winding is reduced to zero when the potentials of the potentiometer are counter-balanced by the thermocouple, a relay connected to the output of the second stage through a rectifier, said first stage producing an output of oscillating direct current, and said second stage producing an amplifying output of oscillating direct current adapted to actuate said relay, said relay oscillating on and off with the oscillation of direct current output of said first and second stages, and a second timing relay controlled by the first relay and adapted to remain closed throughout the oscillation of the first and second stages, and a heater energizing circuit controlled by said second timing relay.

5. In a heater controlling circuit, the combination of a trigger control first stage circuit including a core reactor, with a proportional amplifying second stage including a core reactor, each of said core reactors being provided with alternating current energizing windings and with a capacitor in series with said alternating current windings to provide a resonant circuit, each of said core reactors being provided with a biasing winding, the biasing winding of the second stage being energized from the output of the first stage through a rectifier, and the biasing winding of the first stage being energized through a rectifier, with a substantially constant critical current, a controlling winding on said first stage, and a potentiometer having a thermocouple connected across its circuit for energizing said control winding, whereby current is not provided in the control winding unless the potentiometer is out of balance, and the current in the control winding is reduced to zero when the potentials of the potentiometer are counter-balanced by the thermocouple, a relay connected to the output of the second stage through a rectifier, said first stage producing an output of oscillating direct current, and said second stage producing an amplifying output of oscillating direct current adapted to actuate said relay, said relay oscillating on and off with the oscillation of direct current output of said first and second stages, and a second timing relay controlled by the first relay and adapted to remain closed throughout the oscillation of the first and second stages, and a heater energizing circuit controlled by said second timing relay, said second timing relay having contacts also controlling circuits for the application of a reduced potential to the rectifier of the first stage during the heating period, whereby the heater is shut off or on, before it reaches a predetermined temperature set in order to prevent over-shooting.

6. In a heater controlling circuit, the combination of a thermocouple and a potentiometer for controlling a first stage trigger circuit, with a second stage amplifying circuit for increasing the current output, relay means controlled by said second stage for controlling the on and off heating and cooling periods of a heater, and means for changing the characteristics of energization of the trigger control circuit so that the heater is turned off at a predetermined lower operating point than the set temperature desired.

7. In a constant voltage supply for a temperature controlling circuit, the combination of a transformer provided with a secondary winding and a core reactor having an energizing alternating current winding and having a direct current biasing winding, a rectifier connected to said secondary, and means for connecting said secondary to the energizing alternating current windings of said reactor and for connecting said rectifier output to the direct current biasing winding, and resistance means included in the circuit between said rectifier and said secondary for varying the alternating current output of a circuit connected to said alternating current energizing windings to provide a substantially constant output, irrespective of the fluctuations of the applied line voltage to said transformer.

8. A controlling circuit for heating control comprising a non-linear resonant core reactor circuit, unstable at critical saturation, a controlling source of electromotive force, and an automatic potentiometer connected to be controlled by said electromotive force and to control said circuit responsive to said electromotive force, said resonant core reactor circuit comprising an oscillating circuit, and a holding relay actuated by current from said oscillating circuit, said relay controlling contacts connected to circuits for varying the applied magnitude of said electromotive force to provide different operating conditions for the circuit for heating and for no heating, said controlling circuit being connected to control a heater and being arranged so that heating ceases upon a break of the control circuit, said controlling circuit being arranged to anticipate attainment of a predetermined temperature by operation relative to two reference points whereby the heating effect diminishes as attainment of said temperature is approached.

9. In a heater controlling circuit, the combination of a controlling temperature responsive means subjected to the heating of the heater, with a potentiometer and means for energizing the potentiometer and effecting a condition of balance at a predetermined temperature, an amplifier, comprising a nonlinear, resonant core reactor circuit, unstable at critical saturation, for amplifying the unbalance current conditions of said potentiometer, a relay energized by the output from said amplifier, said relay having contacts controlling the operation of said heater, said relay also having contacts connected to circuits for controlling the amount of applied electromotive force on said potentiometer to produce different operating conditions for heating and for no heating, whereby the heater controlling circuit is arranged to anticipate the attainment of a predetermined temperature by variation relative to two reference points so that the heating effect diminishes as the attainment of said temperature is approached.

10. In a heater controlling circuit, the combination of a transformer adapted to be energized by available A. C. line voltage, said transformer having a secondary, rectifying means energized by said transformer for energizing a potentiometer, temperature responsive means connected in the potentiometer circuit and adapted to produce a condition of balance at a predetermined temperature or unbalance at lower temperatures, a controlling and amplifying circuit, and a relay, said relay being energized by the output from said amplifier, and said controlling circuit comprising a resonant core reactor circuit in which a condition of oscillation and an abrupt rise of current is produced at a predetermined temperature by the action of said temperature responsive means through said potentiometer, said relay having a time lag whereby the relay responds to an oscillating output by effecting actuation of the relay and to nonoscillation and reduced relay input by cutting out of the relay to control a heater.

11. In a heater controlling circuit, the combination of a thermocouple and a potentiometer for controlling a first stage trigger circuit, with a second stage amplifying circuit for increasing the current output, relay means controlled by the output of said second stage for controlling the on and off heating and cooling periods of a heater, and relay means actuated when the heater is turned on or off for changing the characteristics of the energization of the trigger control circuit so that the trigger control circuit is caused to turn off the heater at a predetermined lower operating point than the said temperature desired.

12. In a heater controlling circuit, the combination of a thermocouple and a potentiometer for controlling a first stage trigger circuit, with a second stage amplifying circuit for increasing the current output, relay means controlled by the output of said second stage for controlling the on and off heating and cooling periods of a heater, and relay means actuated when the heater is turned on or off for changing the characteristics of the energization of the trigger control circuit so that the trigger control circuit is caused to turn off the heater at a predetermined lower operating point than the said temperature desired, said latter relay means controlling a pair of contacts adapted to shift the calibrated operating temperature during the heating period.

13. In a heater controlling circuit, the combination of a thermocouple and a potentiometer for controlling a first stage trigger circuit, with a second stage amplifying circuit for increasing the current output, relay means controlled by the output of said second stage for controlling the on and off heating and cooling periods of a heater, and relay means actuated when the heater is turned on or off for changing the characteristics of the energization of the trigger control circuit so that the trigger control circuit is caused to turn off the heater at a predetermined lower operating point than the said temperature desired, said latter relay means controlling a pair of contacts adapted to shift the calibrated operating temperature during the heating period, said contacts cutting in or shunting out a series resistance in the voltage supply to said potentiometer.

14. In a heater controlling circuit, the combination of a thermocouple and a potentiometer for controlling a first stage trigger circuit, with a second stage amplifying circuit for increasing the current output, relay means controlled by the output of said second stage for controlling the on and off heating and cooling periods of a heater, and relay means actuated when the heater is turned on or off for changing the characteristics of the energization of the trigger control circuit so that the trigger control circuit is caused to turn off the heater at a predetermined lower operating point than the said temperature desired, said first mentioned relay means including a main relay in the output of said second stage, said main relay controlling a second relay means including an operating coil shunted by a condenser whereby the second relay is held over in an energized condition, even though the first mentioned relay means is not held over.

15. In a heater controlling circuit, the combination of a thermocouple and a potentiometer for controlling a first stage trigger circuit, with a second stage amplifying circuit for increasing the current output, relay means controlled by the output of said second stage for controlling the on and off heating and cooling periods of a heater, relay means actuated when the heater is turned on or off for changing the characteristics of the energization of the trigger control circuit so that the trigger control circuit is caused to turn off the heater at a predetermined lower operating point than the said temperature desired, and a constant voltage supply source for said circuit comprising a transformer having a primary and a secondary, the said secondary being connected to a core reactor in shunt with the load to maintain substantially constant voltage.

16. In a heater controlling circuit, the combination of a thermocouple and a potentiometer for controlling a first stage trigger circuit, with a second stage amplifying circuit for increasing the current output, relay means controlled by the output of said second stage for controlling the on and off heating and cooling periods of a heater, relay means actuated when the heater is turned on or off for changing the characteristics of the energization of the trigger control circuit so that the trigger control circuit is caused to turn off the heater at a predetermined lower operating point than the said temperature desired, and a constant voltage supply source for said circuit comprising a transformer having a primary and a secondary, the said secondary being connected to a core reactor in shunt with the load to maintain substantially constant voltage, said core reactor being automatically regulated by the direct current output of a rectifier energized from said secondary.

17. In a heater controlling circuit, the combination of a thermocouple and a potentiometer for controlling a first stage trigger circuit, with a second stage amplifying circuit for increasing the current output, relay means controlled by the output of said second stage for controlling the on and off heating and cooling periods of a heater, relay means actuated when the heater is turned on or off for changing the characteristics of the energization of the trigger control circuit so that the trigger control circuit is caused to turn off the neater at a predetermined lower operating point than the said temperature desired, and a constant voltage supply source for said circuit comprising a transformer having a primary and a secondary, the said secondary being connected to a core reactor in shunt with the load to maintain substantially constant voltage, said core reactor being automatically regulated by the direct current output of rectifier energized from said secondary, said rectifier being operated by the alternating voltage drop across a limiting shunted resistor.

18. In a heater controlling circuit, the combination of a thermocouple and a potentiometer for controlling a first stage trigger circuit, with a second stage amplifying circuit for increasing the current output, relay means controlled by the output of said second stage for controlling the on and off heating and cooling periods of a heater, relay means actuated when the heater is turned on or off for changing the characteristics of the energization of the trigger control circuit so that the trigger control circuit is caused to turn off the heater at a predetermined lower operating point than the said temperature desired, and a constant voltage supply source for said circuit comprising a transformer having a primary and a secondary, the said secondary being connected to a core reactor in shunt with the load to maintain substantially constant voltage, said core reactor being automatically regulated by the direct current output of a rectifier energized from said secondary, said rectifier having a regulating predetermined resistance connected in series with its output and adapted to maintain the output voltage constant.

VICTOR W. BREITENSTEIN.

REFERENCES CITED

The following references are of record in the file of this patent:

UNITED STATES PATENTS

| Number | Name | Date |
| --- | --- | --- |
| 1,885,155 | Suits | Nov. 1, 1932 |
| 2,003,945 | Logan | June 4, 1935 |
| 2,067,143 | Logan | June 5, 1937 |
| 2,140,349 | Dawson | Dec. 13, 1938 |
| 2,148,491 | Moore | Feb. 28, 1939 |
| 2,205,777 | Fairchild | June 25, 1940 |
| 2,290,091 | Brown et al. | July 14, 1942 |
| 2,310,955 | Hornfeck | Feb. 16, 1943 |